CATHODE RAY BEAM DEFLECTING CIRCUITS

Filed Feb. 29, 1952

INVENTOR
LAWRENCE J. GIACOLETTO
BY
ATTORNEY

2,712,091

CATHODE RAY BEAM DEFLECTING CIRCUITS

Lawrence J. Giacoletto, Princeton Junction, N. J., assignor to Radio Corporation of America, a corporation of Delaware Application February 29, 1952, Serial No. 274,215

8 Claims. (Cl. 315—27)

This invention relates to cathode ray beam deflection circuits and more particularly to circuits for providing electromagnetic deflection of an electron beam in a cathode ray tube.

According to present United States standards for television transmission, the cathode ray beam is deflected in a horizontal direction at a rate of approximately 15,750 cycles per second, nine-tenths or more of the time for each cycle being used to deflect the beam in one direction horizontally, and the remaining portion of each cycle being used to return the beam horizontally to the starting point of the next scanning line. The portion of the cycle corresponding to the interval of nine-tenths of the cycle is commonly referred to as the trace interval, while the remaining one-tenth of the cycle is commonly referred to as the retrace interval.

When a cathode ray beam is deflected at a relatively rapid rate by electro-magnetic means, it will be recognized that the reversal of current in the deflection coils produces voltages of considerable magnitude.

The distributed capacitance, in combination with the inductance of the deflection coils, forms a parallel resonant circuit which tends to oscillate due to the transient conditions produced by the rapid reversal of the current through the deflection coils. If these oscillations are allowed to continue past the retrace interval, they may distort and/or cause non-linearity during the trace period.

In conventional cathode ray beam deflection circuits it is the usual practice to include means for damping the oscillations, which in conventional circuits may comprise an inverted diode connected across the electro-magnetic beam deflection coils, or in the case where a coupling transformer is interposed between the driving means and deflection coils, the diode may be connected across either the primary or the secondary windings of the coupling transformer. Various circuit arrangements have been devised including a diode damper tube, where the energy included in the oscillations is returned to assist in the deflection during the following trace interval. This results in substantial power conservation. One such arrangement forms the subject matter of the United States Patent 2,309,672 issued February 2, 1943, to Otto H. Schade.

Thus, an inverted diode may serve as a discharge path for the electro-magnetic energy stored in the deflection coils or in the coupling transformer at the end of the retrace interval. In the absence of some damping means this stored energy normally produces a relatively high frequency oscillation in the system, with the result that the deflection of the cathode ray beam during the initial part of the trace is far from linear. When a diode is used as a damping means, one half a cycle of free oscillation is permitted to take place, and thereafter, the energy contained in the deflection coils or coupling transformer may be used for the initial part of the next trace period of the deflection cycle.

Where an indirectly heated cathode type of electron tube is used as a damper tube, the voltage produced by the deflection coils during the retrace interval is of such a high value that serious cathode heater insulation problems arise. Also, since it is necessary for the damper tube to carry relatively high currents, other problems arise with respect to a suitable emissive coating for the cathode.

These limitations on indirectly heated cathode diodes may be overcome in part by using a directly heated filament type tube. However, then it is necessary to provide a separate source of filament potential which is insulated to withstand the stress of the voltages produced by the deflection coils during the retrace interval.

One object of the present invention is to provide an improved deflection circuit for electro-magnetically deflecting a cathode ray beam.

Another object of the present invention is to provide an improved means for damping the transient oscillations in a deflection circuit.

According to the present invention, a secondary emitter tube is included in a cathode ray beam deflection circuit to provide a discharge path for the electro-magnetic energy stored in the deflection circuit during the retrace period. The secondary emitter electron tube may be connected so that a portion of the stored energy is recovered.

Other and incidental objects of this invention will become apparent upon a reading of the specification and an inspection of the drawings in which.

Figures 1, 2, 3, 4, 5:
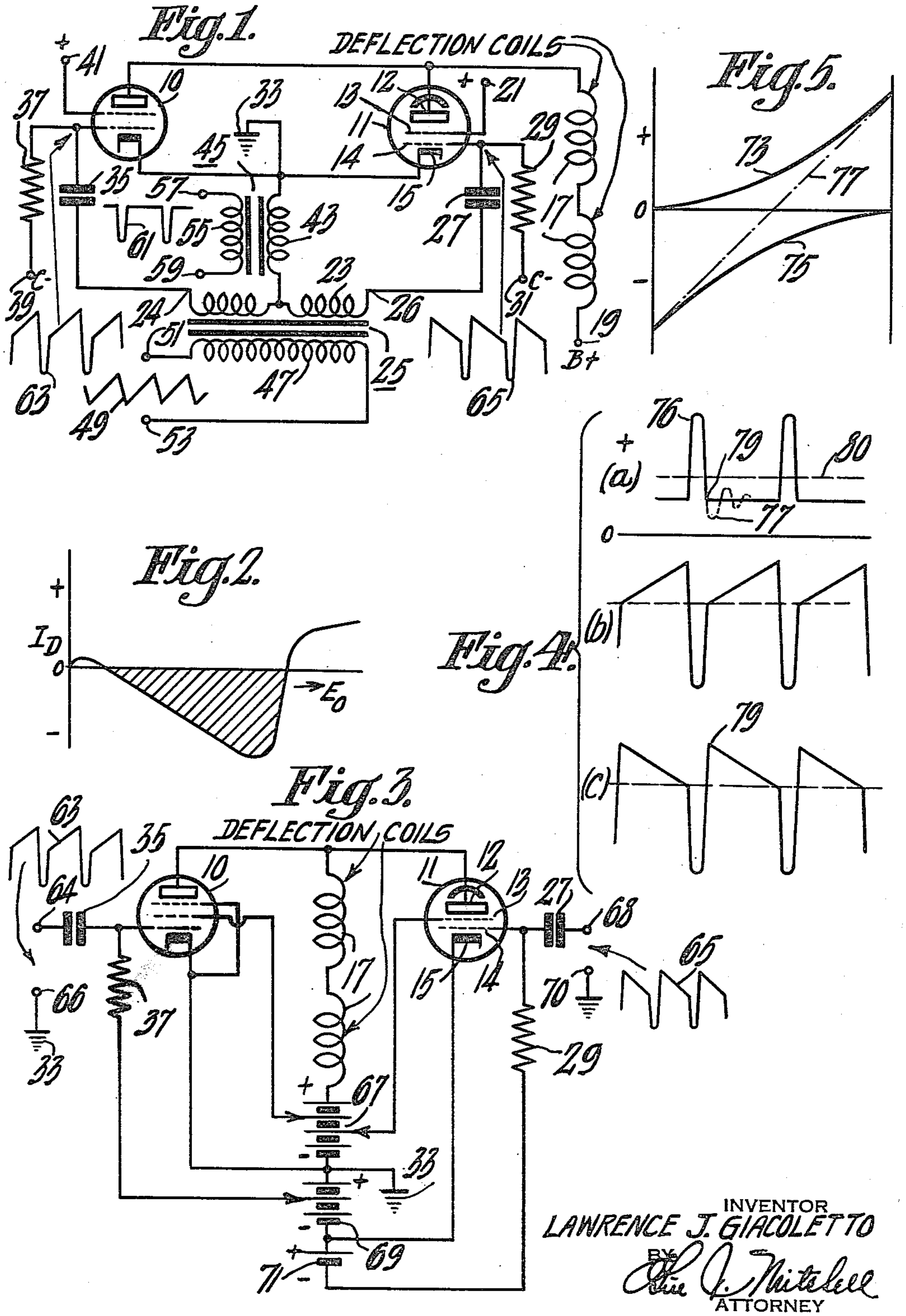
Figure 1 is an illustrative embodiment of the present invention included in a deflection circuit.
Figure 2 is a graphical illustration of the relationship between the dynode current and dynode potential in a secondary emitter electron tube where the collector electrode potential is held constant.
Figure 3 is another illustrative embodiment of the present invention included in a deflection circuit.

Figure 4 comprises three graphical illustrations of voltage waveforms appearing in the illustrative embodiments of Figures 1 and 3; and Figure 5 is a graphical illustration of the deflection current relationships in the illustrative embodiments of Figures 1 and 3 during the trace period of the deflection cycle.

Referring to the drawings in detail and particularly to Figure 1, there is shown a deflection power tube 10 including a cathode, a control electrode, a screen grid, and an anode. Also included in the embodiment of Figure 1, is a secondary emitter tube 11 having a dynode 12, an anode or collector electrode 13, a control electrode 14, and a cathode 15. A conventional tetrode electron tube may be used as the secondary emitter electron tube, although an electron tube of the type having a specially treated secondary emitter electrode is to be preferred. The term "dynode" is used herein to denote any electrode providing secondary emission. The term "collector electrode" is used to designate an element which will draw the secondary emission current. The dynode 12 is shown by the conventional symbol for a secondary emitter element. The inductances 17 represent suitable deflection coils for deflecting a cathode ray beam in a cathode ray tube (not shown). The deflection coils 17 are connected in series between the terminal 19 and the anode of the tube 10, the anode being connected to the dynode 12 of the secondary emitter tube 11. The terminal 19 is adapted to be connected to a source of positive potential of suitable value to provide an operating potential at the anode of the deflection power tube 10. The collector electrode 13 is connected to a terminal 21 which is adapted to be connected to a source of positive potential of suitable value to provide an operating potential at the collector electrode 13. The control electrode 14 of the secondary emitter tube 11 is coupled to the end 26 of the secondary winding 23 of the input transformer 25 by means of the capacitor 27. The control electrode 14 secures its proper operating potential through the resistance 29 from the terminal 31 which is adapted to be connected to a source of operating potential of suitable value. The cathode 15 of the secondary emitter tube 11 is connected to the cathode of the deflection power tube 10, and also to ground reference potential 33.

The control electrode of the deflection power tube 10 is coupled to one end 24 of the secondary winding 23 through a capacitance 35, and secures its proper operating potential through the resistance 37 from the terminal 39 which is adapted to be connected to a source of negative operating potential of suitable value. The screen grid of the deflection power tube 10 is connected to a terminal 41 which may be connected to a suitable source of positive potential.

The secondary 43 of a transformer 45 is connected between the center tap of the winding 23 and ground reference potential 33. The primary 47 of the input transformer 25 is connected between terminals 51 and 53 which are adapted to be connected to a source of control voltage. Numeral 49 designates a suitable voltage waveform for application to the terminals 51 and 53.

The primary 55 of the transformer 45 is connected between terminals 57 and 59 which are adapted to be connected to another source of control voltage which may have the waveform shown at 61. A graph showing the composite waveform appearing at the control electrode of the deflection power tube 10, as a result of the input waveforms 49 and 61 being applied to the input transformers 25 and 45 respectively, is shown at 63. In like manner, a graph showing the composite waveform appearing at the control electrode 14 of the secondary emitter tube 11, as a result of the aforementioned input control voltages, is shown at 65. It will be recognized that the sawtooth input waveform 49 appears in waveforms 63 and 65, 180° out of phase respectively, while the input waveform 61 appears in the waveforms 63 and 65 in the same phase. The control voltage waveforms 63 and 65 are of conventional form, and commonly occur in present day television systems. The transformers 45 and 25 are included to show one suitable means for obtaining these control voltage waveforms.

Figure 2 shows a typical characteristic relationship between dynode potential and dynode current for a secondary emitter tube when the collector electrode potential is held constant. The abscissa of the graph of Figure 2 represents dynode potential $E_d$ while the ordinate of the graph represents the dynode current $I_d$. It will be noted that in the shaded area of the graph the dynode current is of a negative value indicating that the number of secondary electrons emitted by the dynode 11 exceeds the number of impinging primary electrons. By varying the values of dynode potential and collector electrode potential, it is possible to adjust the operating characteristics of a secondary emitter tube so that the dynode will draw current at a desired dynode potential.

Figure 3 is a schematic circuit diagram of another illustrative embodiment of the present invention including certain power conservation features not found in the embodiment of Figure 1. The same reference numerals have been used in Figure 3 as were used in Figure 1 to indicate similar parts. For convenience of description and explanation, means for supplying operating potentials to the embodiment of Figure 3 have been shown symbolically. With the exception of the relative operating potentials applied to the deflection power tube 10 and to the secondary emitter tube 11, and the omission of transformers 25 and 45, the embodiment of Figure 3 is the same as that shown in Figure 1. The deflection coils 17 are connected to the positive end of the battery 67. The negative end of the battery 67 is connected to ground reference potential 33. The screen grid of the deflection power tube 10 is connected to a positive potential by means of a tap on the battery 67. The collector electrode 13 of the secondary emitter tube 11 is also connected to a positive potential provided by the battery 67. The cathode 15 of the secondary emitter tube 11 is held at a negative potential with respect to ground reference potential 33 by means of the battery 69. The control electrode of the deflection power tube 10 secures its negative bias potential by means of a tap on the battery 69. The positive end of the battery 69 is connected to ground reference potential, and the negative end of the battery 69 is connected to the cathode of secondary emitter electron tube 11 and to the positive end of another battery 71. The control electrode of the secondary emitter tube 11 secures its negative bias potential through the resistance 29 from the negative end of the battery 71. A suitable control voltage waveform such as is shown at 63 may be applied between terminals 64 and 66. In like manner a control voltage waveform such as is shown at 65 may be applied between the terminals 68 and 70.

The overall operation of the present invention may best be understood by a consideration of Figures 2, 4, and 5 along with the schematic circuit representations of Figures 1 and 3. Figure 4($b$) shows in greater detail the operating waveform 63, and Figure 4($c$), in like manner, shows in greater detail the operating waveform 65. These waveforms are redrawn in Figure 4 to more clearly show their relationship to one another, and to the voltage waveform of Figure 4($a$).

The current passed by the deflection power tube 10 as a result of the application of a cycle of the waveform of 4($b$) is shown in Figure 5 and designated 73. In like manner, the current passed by the secondary emitter tube 11, when the waveform of Figure 4($c$) is applied to its control electrode 14, is shown in Figure 5 and designated 75. The dash line 77 represents the composite current flow through the deflection coils 17.

Assuming that a current is flowing in the deflection coils 17, when a sudden current reversal is effected, as during the retrace interval, the collapsing electro-magnetic field surrounding the deflection coils 17 will induce a large voltage. This is shown in Figure 4($a$) at 76. This voltage will tend to shock excite the parallel resonant circuit provided by the distributed capacitances and inductances of the deflection coils 17 into oscillation. If these oscillations are allowed to continue, they might follow the waveform shown by the dotted lines and indicated by the numeral 77 in Figure 4($a$). This period of oscillation may extend into and distort the trace interval. However, the secondary emitter tube 11 is caused to conduct at point 79 of the curve 4($a$) when the waveform of 4($c$) is applied to the control electrode 14 of the secondary emitter tube 11. At this point in time the collector electrode 13 of the secondary emitter tube is at a positive potential slightly above the positive potential occurring at the dynode. The potential of the collector electrode is shown in Figure 4($a$) by the dashed line 80. These values of potential may be chosen to occur along the shaded portion of the curve of Figure 2 wherein electron current flows out of the deflection circuit through the dynode 12 to the collector 13. The decreasing control voltage applied to the control electrode 14, shown in Figure 4($c$), causes the secondary emission currents flowing in the secondary emitter tube 11 to decrease as shown in Figure 5 at 75. During this period, however, the deflection power tube 10 is being gradually rendered conducting by the operating waveform of Figure 4($b$) applied to the control electrode of the deflection power tube 10. This will cause the electron current flowing from the cathode to the anode of deflection power tube 10 to increase as shown in Figure 5 at 73. The simultaneous increase of current through the deflection power tube 10, and decrease of the current through the secondary emitter tube 11 may be proportioned to provide a resultant current through the deflection coils 17 as shown in Figure 5 by the dash line 77. By proper choice of operating potentials and circuit parameters the current flow through the deflection coils 17 may be made to approach linearity. However, it is understood that various circuit modifications such as wave shaping circuits or the like might be included in the embodiments of Figure 1 and Figure 3 to provide a desired current through the deflection coils 17 without departing from the spirit of the present invention.

The operation of the embodiment of Figure 3 is similar to that of the embodiment of Figure 1. However, since the cathode 15 of the secondary emitter electron tube 11 is held at a minus potential it is possible to provide suitable secondary emission currents from the dynode 12 to the collector 13 with a much lower value of collector electrode potential. This results in a substantial power saving since the electrons flowing out of ground reference potential 33, through the horizontal deflection power tube 10, and through the deflection coils 17 return through the dynode 12 and the collector electrode 13 to more nearly ground reference potential.

What is claimed is:

1. A deflection circuit for electro-magnetically deflecting a cathode ray beam including a deflection power tube having at least a cathode, a control electrode, and an anode, at least one cathode ray beam deflection coil coupled between the anode and cathode of said deflection power tube, whereby deflection currents are provided in said deflection coil, means for applying a cyclically varying voltage between the control electrode and cathode of said deflection power tube, a secondary emitter electron tube having at least a cathode, a control electrode, a collector electrode, and a dynode, means connecting said secondry emitter tube across said deflection coil, whereby the secondary emission current in said secondary emitter tube is caused to flow through said deflection coil in a direction opposite to the direction of current flow provided by said power tube, and means for applying a cyclically varying voltage between the cathode and control electrode of said secondary emitter tube to control the intensity of the current produced by secondary emission therein.

2. A deflection circuit for electro-magnetically deflecting a cathode ray beam including at least one cathode ray beam deflection coil, a deflection wave amplifying electron tube coupled across said deflection coil, a secondary emitter electron tube having at least a cathode, a control electrode, a collector electrode, and a dynode, the dynode of said secondary emitter electron tube being coupled to one end of said deflection coil, and means coupling the collector electrode of said secondary emitter electron tube to the other end of said deflection coil, whereby the secondary emission current in said secondary emitter electron tube is caused to flow through said deflection coil in an opposite direction to the direction of current flow produced by said deflection wave amplifying electron tube.

3. A deflection circuit for electro-magnetically deflecting a cathode ray beam including at least one cathode ray beam deflection coil, a secondary emitter electron tube having at least a cathode, a control electrode, a collector electrode, and a dynode, means coupling the dynode of said secondary emitter electron tube to one end of said deflection coil, means coupling the collector electrode of said secondary emitter electron tube to the other end of said deflection coil, and deflection wave amplifying means separate from said secondary emitter electron tube coupled across said deflection coil, whereby the secondary emission current in said secondary emitter electron tube is caused to flow through said deflection coil in an opposite direction to the direction of current flow produced by said deflection wave amplifying means, and means for applying a cyclically varying voltage between the control electrode and cathode of said secondary emitter tube.

4. A deflection circuit for electro-magnetically deflecting a cathode ray beam, including at least one cathode ray beam deflection coil having a period of transient oscillation, means coupled to said deflection coil for supplying deflection waves to said deflection coil, means coupled to said deflection coil for damping the transient oscillations in said deflection coil, said damping means including a secondary emitter electron tube having at least a cathode, a control electrode, a collector electrode, and a dynode, means for providing secondary emission currents between the dynode and collector electrode of said secondary emitter electron tube, and means for coupling said deflection coil between said dynode and said collector electrode, whereby the transient oscillations in said deflection coil are damped by the secondary emission current in said secondary emitter electron tube.

5. A deflection circuit for electro-magnetically deflecting a cathode ray beam, including at least one cathode ray beam deflection coil, means coupled to said deflection coil for supplying deflection waves to said cathode ray beam deflection coil, a secondary emitter electron tube having at least a collector electrode and a dynode, means for causing secondary emission currents to flow between the dynode and collector electrode of said secondary emitter electron tube, and means coupling said deflection coil between the dynode and collector electrode of said secondary emitter electron tube.

6. A deflection circuit for electro-magnetically deflecting a cathode ray beam including at least one cathode ray beam deflection coil, a deflection wave amplifying tube coupled across said deflection coil, a secondary emission electron discharge device having a secondary emitter electrode and a collector electrode, means coupling said deflection coil between said secondary emitter electrode and said collector electrode, said secondary emission electron discharge device being operative to pass secondary emission current through said deflection coil in an opposite direction to the direction of current flow provided by said deflection wave amplifying electron tube.

7. In a deflection circuit for electro-magnetically deflecting a cathode ray beam, said deflection circuit having a transient period of oscillation, apparatus including the combination of, at least one cathode ray beam deflection coil, means coupled to said deflection coil for supplying deflection waves to said deflection coil, a secondary emission electron discharge device having a secondary emitter electrode and a collector electrode, means for providing secondary emission current from said secondary emitter electrode to said collector electrode, said deflection coil being coupled between said secondary emitter electrode and said collector electrode, said secondary emission electron discharge device being operative to damp the transient oscillation in said deflection circuit.

8. In a deflection circuit having at least one deflection coil for electromagnetically deflecting an electron beam, apparatus for damping transient oscillations appearing in said deflection coil, said apparatus including a secondary emitter electron discharge device having a dynode and a collector electrode, means for providing secondary emission currents from said dynode to said collector electrode, means for coupling said deflection coil between the dynode and the collector electrode of said secondary emitter electron discharge device, said secondary emitter electron device being operative to damp the transient oscillations appearing in said deflection coil.

References Cited in the file of this patent

UNITED STATES PATENTS

| | | |
|---|---|---|
| 2,297,522 | Zanarini | Sept. 29, 1942 |
| 2,369,631 | Zanarini | Feb. 13, 1945 |
| 2,475,644 | Soller | July 12, 1949 |
| 2,537,807 | Anderson | Jan. 9, 1951 |